(12) United States Patent
Wada

(10) Patent No.: US 11,231,399 B2
(45) Date of Patent: Jan. 25, 2022

(54) SAMPLE TEMPERATURE ADJUSTMENT DEVICE

(71) Applicant: SHIMADZU CORPORATION, Kyoto (JP)

(72) Inventor: Kosuke Wada, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 35 days.

(21) Appl. No.: 16/956,151

(22) PCT Filed: Jan. 22, 2018

(86) PCT No.: PCT/JP2018/001699
§ 371 (c)(1),
(2) Date: Jun. 19, 2020

(87) PCT Pub. No.: WO2019/142343
PCT Pub. Date: Jul. 25, 2019

(65) Prior Publication Data
US 2020/0371071 A1   Nov. 26, 2020

(51) Int. Cl.
*G01N 30/54* (2006.01)
*G01N 1/10* (2006.01)
(Continued)

(52) U.S. Cl.
CPC ............. *G01N 30/54* (2013.01); *G01N 1/10* (2013.01); *G01N 1/28* (2013.01); *G01N 30/24* (2013.01)

(58) Field of Classification Search
CPC ....... B01L 2200/147; B01L 2300/1822; B01L 2300/1844; B01L 7/00; G01N 1/10;
(Continued)

(56) References Cited

U.S. PATENT DOCUMENTS

| 4,453,385 A | 6/1984 | May |
| 6,170,267 B1 | 1/2001 | Kitaoka |

(Continued)

FOREIGN PATENT DOCUMENTS

| JP | 60-140039 A | 7/1985 |
| JP | 7-333227 A | 12/1995 |

(Continued)

OTHER PUBLICATIONS

International Search Report for corresponding Application No. PCT/JP2018/001699, dated Apr. 17, 2018.
(Continued)

*Primary Examiner* — John Fitzgerald
*Assistant Examiner* — Truong D Phan
(74) *Attorney, Agent, or Firm* — Renner, Otto, Boisselle & Sklar, LLP

(57) ABSTRACT

A sample temperature adjustment device includes a temperature control space for controlling a temperature of a sample by containing the sample inside, a heat insulating layer enclosing the temperature control space so that the temperature control space is thermally separated from outside air of the sample temperature adjustment device, a cooling part for cooling the temperature control space, a heat transfer plate covering at least a part of outer surfaces of the heat insulating layer, and a heater that heats the heat transfer plate to prevent dew condensation on a surface of the heat transfer plate.

8 Claims, 2 Drawing Sheets

(51) Int. Cl.
 *G01N 1/28* (2006.01)
 *G01N 30/24* (2006.01)
(58) Field of Classification Search
 CPC .... G01N 1/28; G01N 2030/027; G01N 30/24;
  G01N 30/54; G01N 2030/121; G01N
  30/26; G01N 30/30; G01N 2030/303;
  G01N 2001/2282; G01N 25/145; G01N
  25/4826; G01N 2001/2261; G01N
  2021/158; G01N 2291/0253; G01N
  30/28; G01N 2035/00346; G01N
  2035/00445; G01N 2223/31; G01N
  2223/3103; F25B 47/006; F25B 21/02;
  F25D 21/04
 See application file for complete search history.

(56) References Cited

U.S. PATENT DOCUMENTS

| | | | |
|---|---|---|---|
| 9,606,033 | B2 | 3/2017 | Maeda |
| 2015/0355061 | A1* | 12/2015 | Inoue ..................... G01N 1/42 |
| | | | 73/863.11 |
| 2016/0202279 | A1 | 7/2016 | Endo |

FOREIGN PATENT DOCUMENTS

| | | | | |
|---|---|---|---|---|
| JP | 2000-74802 A | 3/2000 | | |
| JP | 2003-35482 A | 2/2003 | | |
| JP | 2016-176749 A | 10/2016 | | |
| JP | WO2015162680 A1 * | 4/2017 | ............. | G01N 30/18 |
| WO | 2014/042011 A1 | 3/2014 | | |
| WO | 2015/162680 A1 | 10/2015 | | |

OTHER PUBLICATIONS

Written Opinion for corresponding Application No. PCT/JP2018/001699, dated Apr. 17, 2018.

* cited by examiner

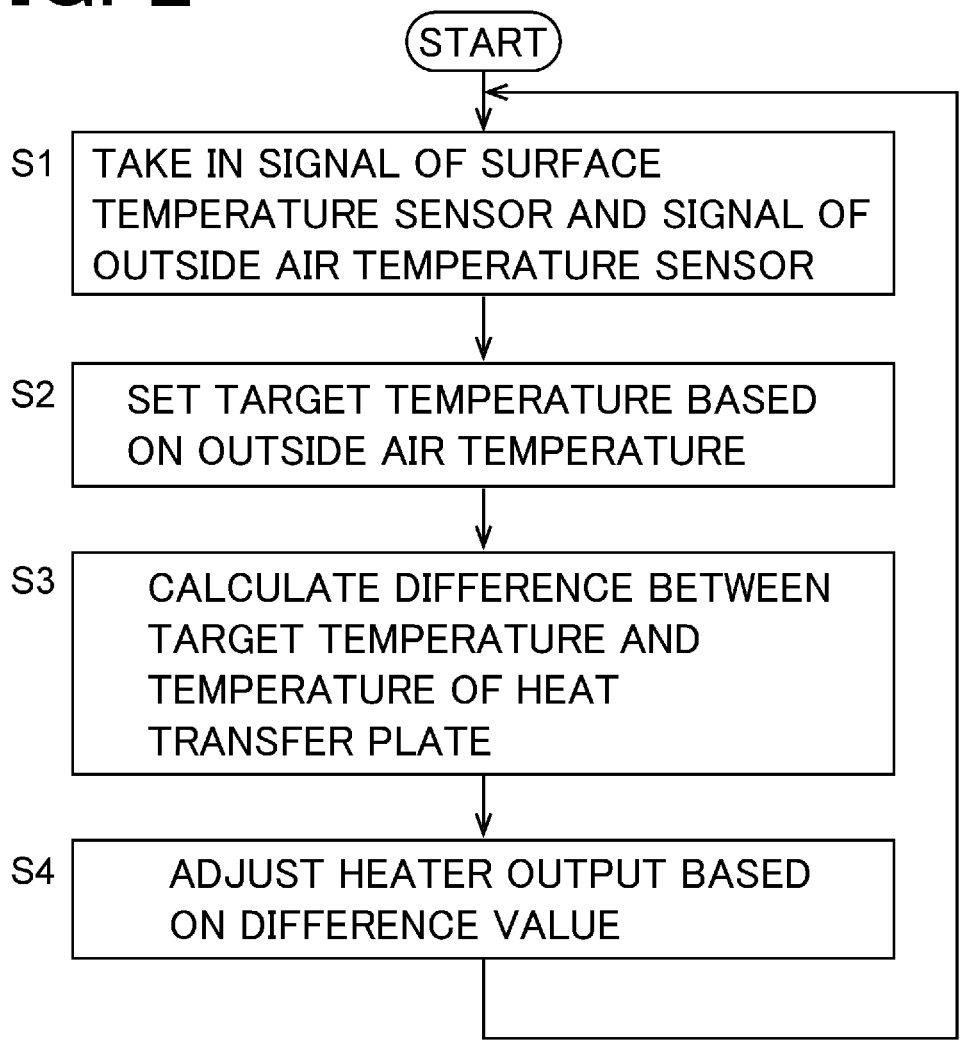

SAMPLE TEMPERATURE ADJUSTMENT DEVICE

TECHNICAL FIELD

The present invention relates to a sample temperature adjustment device, which is used in an analysis device, such as a liquid chromatograph, and controls a temperature while cooling a sample.

BACKGROUND ART

Some liquid chromatograph autosamplers have a function of cooling a sample plate containing a sample to be analyzed to maintain the temperature at a constant temperature in order to prevent alteration or the like of the sample (for example, see Patent Document 1). In the present application, devices such as an autosampler having such a sample temperature control function are collectively referred to as "sample temperature adjustment devices".

Cooling temperature control systems of a sample include a direct cooling system in which a sample plate containing a sample is placed on a metal plate on which a cooling element, such as a Peltier element, is attached and a container is directly cooled, as well as an air cooling system in which a sample plate is disposed in space (hereinafter referred to as temperature control space) thermally separated from outside air, and air in the temperature control space is cooled by a cooling element, such as a Peltier element.

While the direct cooling system has an advantage that a response speed of temperature control is excellent since the sample plate is directly cooled, there is also a problem that it is difficult to uniformly cool the sample plate since the sample plate is locally cooled from a lower surface side of the sample plate. While the air cooling system is inferior to the direct cooling system in a response speed of temperature control, it is easy to cool a sample plate uniformly in the air cooling system as compared with the direct cooling system since the temperature control space in which the sample plate is disposed is cooled entirely.

PRIOR ART DOCUMENT

Patent Document

Patent Document 1: Japanese Patent Laid-open Publication No. 2016-176749

SUMMARY OF THE INVENTION

Problems to be Solved by the Invention

In a case where the air cooling system is employed as the cooling temperature control system, there is a problem of dew condensation due to leakage of cold air from the temperature control space. The temperature control space is thermally separated from the outside air by being enclosed by a heat insulating material. However, due to structural restrictions for drawing pipes and wiring into the temperature control space, restrictions of device size, and the like, a portion where the thickness of the heat insulating material cannot be secured sufficiently exists. If a surface temperature of the heat insulating material decreases due to the cold air leaking to the outside of the heat insulating material from such a portion, dew condensation may occur on a surface of the heat insulating material, especially in a hot and humid environment. Water of such dew condensation wetting important components such as an electric board and a valve may cause a failure of the electric board and rust of the valve, and may cause a serious failure of the device.

In view of the above, an object of the present invention is to provide a structure which can prevent dew condensation resulting from cold air which flows out from the temperature control space.

Solutions to the Problems

A sample temperature adjustment device according to the present invention includes a temperature control space for controlling a temperature of a sample by containing the sample inside, a heat insulating layer enclosing the temperature control space so that the temperature control space is thermally separated from outside air of the sample temperature adjustment device, a cooling part for cooling the temperature control space, a heat transfer plate covering at least a part of outer surfaces of the heat insulating layer, and a heater that heats the heat transfer plate to prevent dew condensation on a surface of the heat transfer plate.

In the present invention, a heat transfer plate is disposed on the outer surfaces of the heat insulating layer that encloses the temperature control space, and the heat transfer plate is heated by a heater, so that generation of dew condensation resulting from cold air flowing out from the temperature control space can be prevented. Such a dew condensation prevention structure, which may be applied to all of the outer surfaces of the heat insulating layer enclosing the temperature control space, may also be applied to only a part of the outer surfaces of the heat insulating layer, that is, a portion where dew condensation is not desirable and/or a portion where dew condensation is likely to be generated.

The sample temperature adjustment device of the present invention preferably further includes an outer heat insulating layer that covers the surface of the heat transfer plate. In such a manner, a heat radiation amount from the heat transfer plate is reduced, so that heating efficiency of the heat transfer plate by the heater is improved, and generation of dew condensation can be prevented with a smaller heater output.

As a more preferred embodiment of the present invention, there is one that includes a surface temperature sensor for measuring a temperature of the surface of the heat transfer plate, and a heater control part configured to set a target temperature higher than a dew point, and control output of the heater based on an output of the surface temperature sensor so that the temperature of the heat transfer plate becomes the target temperature.

In the above case, an outside air temperature sensor for measuring a temperature of outside air of the sample temperature adjustment device is further included, and the heater control part is preferably configured to set the target temperature based on the temperature of outside air measured by the outside air temperature sensor. Since dew condensation is more likely to be generated as a temperature difference from the temperature of outside air is larger, the target temperature of the heat transfer plate is set based on the temperature of outside air, so that generation of dew condensation can be prevented more reliably.

In the above case, the heater control part is preferably configured to set the target temperature to a temperature substantially the same as the temperature of outside air measured by the outside air temperature sensor. In this manner, output of the heater that heats the heat transfer plate is adjusted to a magnitude that cancels cold air that flows out from the heat insulating layer, so that generation of dew condensation can be prevented with a minimum heater output.

An example of the cooling part in the present invention includes a Peltier element and a fan, and is configured to blow air cooled by the Peltier element toward the sample disposed in the temperature control space.

In the above case, the sample may be disposed near a bottom surface of the temperature control space in a state of being held on the sample plate. In that case, air cooled by the Peltier element flows on the bottom surface side of the temperature control space, and dew condensation is considered to be likely to be generated on an outer surface of the heat insulating layer covering the bottom surface side of the temperature control space. Accordingly, the heat transfer plate is preferably provided so as to cover the heat insulating layer positioned near the bottom surface of the temperature control space.

An example of the sample temperature adjustment device according to the present invention is an autosampler for a liquid chromatograph. In the autosampler, an opening for drawing a pipe and wiring into the temperature control space needs to be provided on the sheet metal or the heat insulating layer that form the temperature control space, and cold air in the temperature control space may flow out from such an opening. When the above-described dew condensation prevention structure is applied to a surface provided with such an opening, generation of dew condensation resulting from cold air flowing out from the opening can be effectively prevented.

Effects of the Invention

In the sample temperature adjustment device of the present invention, a heat transfer plate is disposed on outer surfaces of a heat insulating layer that encloses the temperature control space, and the heat transfer plate is heated by a heater, so that generation of dew condensation resulting from cold air flowing out from the temperature control space can be prevented. Since such a dew condensation prevention structure can be applied to a desired surface where generation of dew condensation is not desirable of an outer surface of the heat insulating layer, a failure of an electronic board and rust of a valve and the like caused by dew condensation water can be prevented.

BRIEF DESCRIPTION OF THE DRAWINGS

FIG. 2 is a flowchart showing an example of temperature control operation of a heat transfer plate of the embodiment.

EMBODIMENTS OF THE INVENTION

Figure 1:
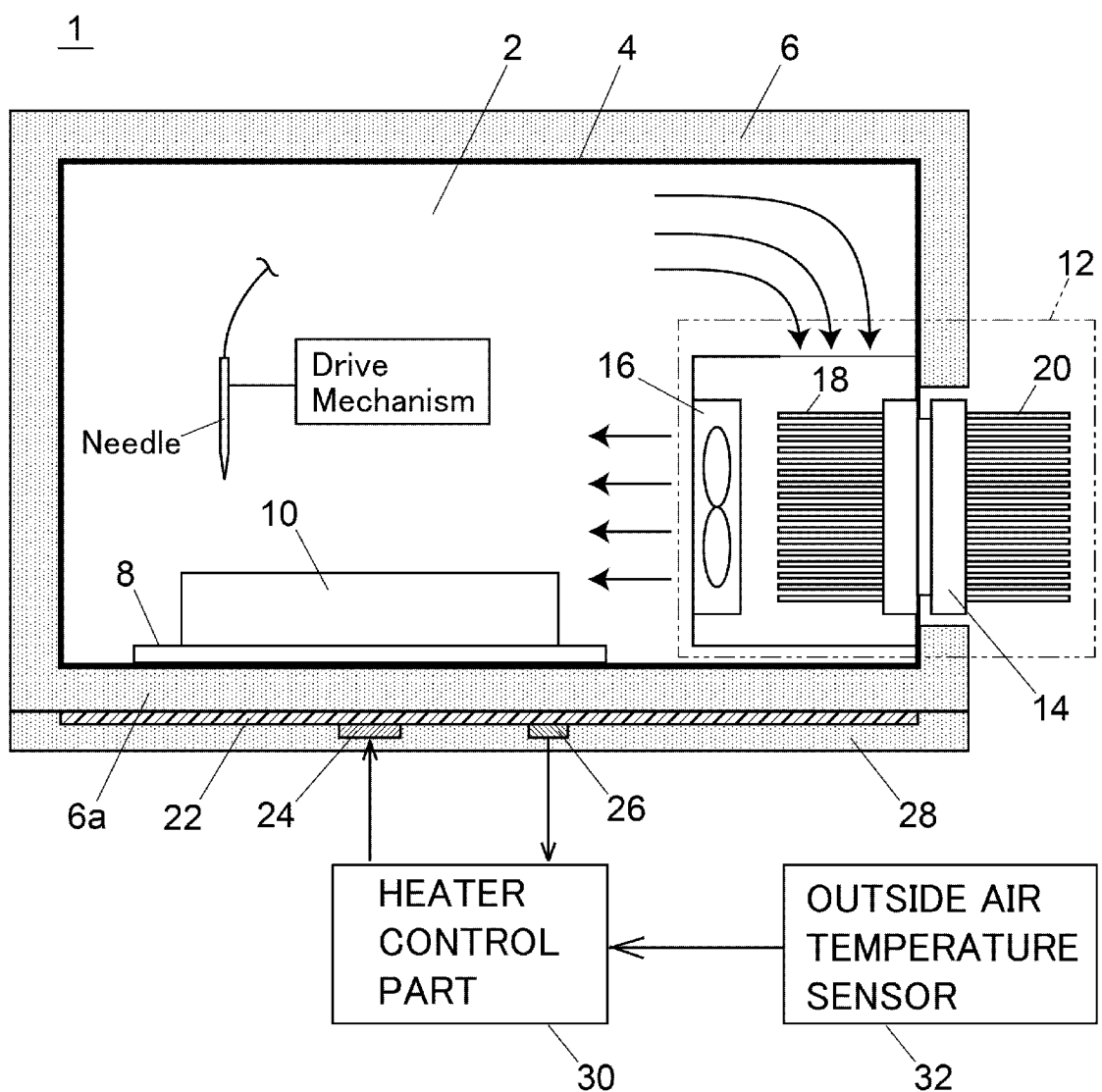
FIG. 1 is a schematic cross-sectional configuration diagram showing an embodiment of the sample temperature adjustment device.

Hereinafter, an embodiment of the sample temperature adjustment device according to the present invention will be described with reference to the accompanying drawings.

A sample temperature adjustment device 1 includes temperature control space 2 in sheet metal 4 formed of sheet metal and the like. An outer peripheral surface of the sheet metal 4 is covered with a heat insulating layer 6 made of, for example, a polyethylene resin foam material, except for a heat radiation portion of a cooling part 12 described later. That is, the cooling part 12 is thermally separated from outside air by the heat insulating layer 6.

A sample plate 10 holding a sample is installed, in a state of being mounted on a rack 8, in the temperature control space 2. The sample plate 10 may hold a plurality of vials containing a sample, or may have a plurality of wells containing a sample provided on a top surface. In the present embodiment, the rack 8 on which the sample plate 10 is mounted is set near a bottom surface of the temperature control space 8.

The cooling part 12 is attached to a side wall of the sheet metal 4 forming the temperature control space 2. The cooling part 12 includes a Peltier element 14, a fan 16, a heat absorbing fin 18, and a heat radiating fin 20. The Peltier element 14 is provided so that a heat absorption side is disposed inside of the temperature control space 2 and a heat radiation side is disposed outside of the temperature control space 2. The heat absorbing fin 18 is attached to an endothermic surface of the Peltier element 14, and the heat radiating fin 20 is attached to a heat dissipation surface of the Peltier element 14. The fan 16 is provided so as to blow air cooled by the Peltier element 14 toward the sample plate 10.

The sample temperature adjustment device 1 is realized by, for example, an autosampler for a liquid chromatograph. In a case where the sample temperature adjustment device 1 is an autosampler, a needle or a syringe pump for sucking a sample held by the sample plate 10, a drive mechanism for moving the needle, and the like are also provided in the temperature control space 2.

A heat transfer plate 22 made from metal such as aluminum having excellent thermal conductivity is provided on an outer side (lower side) of the heat insulating layer 6 on a bottom surface side 6a of the heat insulating layer 6 that encloses the temperature control space 2, and a surface of the heat transfer plate 22 is covered with an outer heat insulating layer 28 made from, for example, a polyethylene resin foam material. A heater 24 and a surface temperature sensor 26 are attached to the heat transfer plate 22. The heater 24 is for heating the heat transfer plate 22 so that a surface temperature of the heat transfer plate 22 does not fall below a dew point, and the surface temperature sensor 26 is for measuring a surface temperature of the heat transfer plate 22.

Output of the heater 24 is controlled by a heater control part 30. The heater control part 30 is configured to control the output of the heater 24 so that a surface temperature of the heat transfer plate 22 measured by the surface temperature sensor 26 reaches a target temperature. The heater control part 30 is a function obtained by an arithmetic element such as a microcomputer executing a predetermined program.

The target temperature of the heat transfer plate 22 is set by the heater control part 30 based on a temperature (outside air temperature) outside the temperature control space 2 measured by an outside air temperature sensor 32 provided at any position outside the temperature control space 2. A preferred example of the target temperature is a temperature substantially the same as the outside air temperature measured by the outside air temperature sensor 32. However, the present invention is not limited to this, and the heater control part 30 may be configured to set, as the target temperature, a temperature lower than the outside air temperature or a temperature higher than the outside air temperature to an extent that dew condensation is not generated on a surface of the heat transfer plate 22.

With the above structure, the temperature of the heat transfer plate 22 is controlled so as not to fall below a dew point, so that dew condensation is not generated on an outer side of the heat insulating layer 6 on the bottom surface side 6a. For this reason, even in a case where an opening for drawing a pipe or wiring into the temperature control space 2 is provided on a bottom surface of the sheet metal 4, dew condensation resulting from outflow of cold air from the opening can be prevented. Therefore, since dew condensation water does not drip below the outer heat insulating layer 28, components such as an electronic circuit and a valve can be disposed at a position lower than the outer heat insulating layer 28.

Next, an example of temperature control operation of the heat transfer plate 22 will be described using a flowchart of FIG. 2.

A signal from the surface temperature sensor 26 and a signal from the outside air temperature sensor 32 are taken into an electronic circuit having the heater control part as a function at regular intervals (Step S1). The heater control part 30 executes operation described below each time a signal from the surface temperature sensor 26 and a signal from the outside air temperature sensor 32 are taken in. First, the target temperature is set based on the outside air temperature measured by the outside air temperature sensor 32 (Step S2). The target temperature is higher than a dew point and is, for example, substantially the same temperature as the outside air temperature. After the target temperature is set, a difference between the target temperature and a surface temperature of the heat transfer plate 22 measured by the surface temperature sensor 26 is obtained (Step S3), and output of the heater 24 is adjusted based on the difference value so that the surface temperature of the heat transfer plate 22 becomes closer to the target temperature (Step S4).

Note that, in a case where the target temperature of the heat transfer plate 22 is the same as the outside air temperature, the heater control part 30 may be configured to take a difference between the signal of the outside air temperature sensor and the signal of the surface temperature sensor, and adjust output of the heater 24 based on the difference value.

In the sample temperature adjustment device 1 described above, the dew condensation prevention structure including the heat transfer plate 22, the heater 24, the surface temperature sensor 26, and the outer heat insulating layer 28 is provided only on the outer side of the heat insulating layer 6 on the bottom surface side 6a. However, such a dew condensation prevention structure can be provided on an outer side of any surface of the heat insulating layer 6 as necessary.

Further, the outer heat insulating layer 28 is provided for the purpose of improving heating efficiency of the heat transfer plate 22 by the heater 24, and is not an essential constituent from the viewpoint of preventing dew condensation.

DESCRIPTION OF REFERENCE SIGNS

1: Sample temperature adjustment device
2: Temperature control space
4: Sheet metal
6, 6a: Heat insulating layer
8: Rack
10: Sample plate
12: Cooling part
14: Peltier element
16: Fan
18: Heat absorbing fin
20: Heat radiating fin
22: Heat transfer plate
24: Heater
26: Surface temperature sensor
28: Outer insulating layer
30: Heater control part
32: Outside temperature sensor

The invention claimed is:

1. A sample temperature adjustment device for an analysis device, comprising:
   a temperature control space for controlling a temperature of a sample by containing the sample inside;
   a heat insulating layer enclosing the temperature control space so that the temperature control space is thermally separated from outside air of the sample temperature adjustment device;
   a cooling part for cooling the temperature control space by blowing cold air into the temperature control space;
   a heat transfer plate covering at least a part of outer surfaces of the heat insulating layer; and
   a heater that heats the heat transfer plate to prevent condensation on a surface of the heat transfer plate.

2. The sample temperature adjustment device according to claim 1, further comprising an outer heat insulating layer that covers the surface of the heat transfer plate.

3. The sample temperature adjustment device according to claim 1, wherein
   the sample temperature adjustment device is an autosampler for a liquid chromatograph.

4. The sample temperature adjustment device according to claim 1, wherein
   the cooling part includes a Peltier element and a fan, and is configured to blow air cooled by the Peltier element toward the sample disposed in the temperature control space.

5. The sample temperature adjustment device according to claim 4, wherein
   the sample is disposed on a bottom surface of the temperature control space in a state of being held by a sample plate, and
   the heat transfer plate is provided so as to cover the heat insulating layer positioned near the bottom surface of the temperature adjusting space.

6. The sample temperature adjustment device according to claim 1, further comprising:
   a surface temperature sensor for measuring a temperature of the surface of the heat transfer plate; and
   a heater control part configured to set a target temperature higher than a dew point, and control output of the heater based on an output of the surface temperature sensor so that the temperature of the heat transfer plate becomes the target temperature.

7. The sample temperature adjustment device according to claim 6, further comprising an outside air temperature sensor for measuring a temperature of outside air of the sample temperature adjustment device, wherein
   the heater control part is configured to set the target temperature based on the temperature of outside air measured by the outside air temperature sensor.

8. The sample temperature adjustment device according to claim 7, wherein
   the heater control part is configured to set the target temperature to a temperature substantially same as the temperature of outside air measured by the outside air temperature sensor.

* * * * *